US007130781B2

(12) United States Patent
Bay et al.

(10) Patent No.: US 7,130,781 B2
(45) Date of Patent: Oct. 31, 2006

(54) ONE-DIMENSIONAL MODELING OF THE MANUFACTURE OF MULTI-LAYERED MATERIAL

(75) Inventors: Randy S. Bay, Woodbury, MN (US); Elisa J. Collins, Oakdale, MN (US); James N. Dobbs, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 695 days.

(21) Appl. No.: 10/120,588

(22) Filed: Apr. 10, 2002

(65) Prior Publication Data

US 2003/0200064 A1 Oct. 23, 2003

(51) Int. Cl.
G06G 7/48 (2006.01)
(52) U.S. Cl. ........................................................ 703/7
(58) Field of Classification Search ................ 700/127, 700/130, 155, 156, 29–31, 122, 226; 156/363; 703/7
See application file for complete search history.

(56) References Cited

U.S. PATENT DOCUMENTS

| | | | |
|---|---|---|---|
| 4,497,121 A | | 2/1985 | Choinski |
| 5,398,336 A | * | 3/1995 | Tantry et al. ........... 707/103 R |
| 5,519,623 A | | 5/1996 | Pourboghrat |
| 5,640,752 A | | 6/1997 | Steiner |
| 5,650,260 A | | 7/1997 | Onishi |
| 5,831,853 A | | 11/1998 | Bobrow et al. |
| 5,936,861 A | | 8/1999 | Jang et al. |
| 6,053,947 A | * | 4/2000 | Parson ........................ 703/14 |
| 6,273,984 B1 | * | 8/2001 | Bourdelais et al. .... 156/244.22 |
| 2003/0100972 A1 | * | 5/2003 | Andersh ..................... 700/121 |

FOREIGN PATENT DOCUMENTS

| | | |
|---|---|---|
| DE | 197 31 980 A1 | 1/1999 |
| EP | 0 809 156 A1 | 11/1997 |
| WO | WO 00/52265 | 9/2000 |
| WO | WO 01/20534 A1 | 3/2001 |
| WO | WO 01/83345 A1 | 11/2001 |

OTHER PUBLICATIONS

"Calculation of Cooling Processes in Extrusion", W. Michaeli and G. Menges, Polymer Engineering Review, pp. 99, 101, 103, 105, 107, 109, 111, 113, 115, 117, 119, 121.
"Heat-Transfer Model Assessment of Chill Rolls for Polymer Film Extrusion", Enio Kumpinsky, Ind. Eng. Chem. Res., vol. 32, No. 11, 1993, pp. 2866-2872.

(Continued)

Primary Examiner—Paul L. Rodriguez
Assistant Examiner—Juan Carlos Ochoa
(74) Attorney, Agent, or Firm—Brian Szymanski; Steven A. Bern

(57) ABSTRACT

In general, techniques are described for the creation and execution of accurate models for the manufacture of complex, multi-layered materials. The techniques may be used to calculate variations of a process parameter within the material during the manufacturing process. A method comprises receiving segment data that partitions a manufacturing process into a set of segments having at least one layer of a material. For example, the segment data may partition the manufacturing processes along a path traversed by the material within the manufacturing process. The method further comprises receiving curvature data for the layers, and calculating values for a process parameter through the layers of the segments as a function of the curvature data. The method may comprise invoking a one-dimensional model, such as a one-dimensional finite difference model, to calculate the values for the defined segments and layers.

14 Claims, 12 Drawing Sheets

OTHER PUBLICATIONS

"Modeling of Multilayer Drying of Polymer Films", Sacide Alsoy, J. Larry Duda, *Journal of Polymer Science: Part B: Polymer Physics*, vol. 37, 1999 John Wiley & Sons, Inc., pp. 1665-1675.

"Predictions of the Temperature Profile Within Composite Sheets During Pre-Heating", J.E. Cunningham, P.F. Monahgan and M.T. Brogan, *Composites Part A*, 1997 Elsevier Science Limited, pp. 51-61.

* cited by examiner

FIG. 11

ONE-DIMENSIONAL MODELING OF THE MANUFACTURE OF MULTI-LAYERED MATERIAL

TECHNICAL FIELD

The invention relates to computer modeling, such as computer modeling of manufacturing processes.

BACKGROUND

In any industrial manufacturing environment, accurate control of the manufacturing process can be essential. Ineffective process control can lead to products that fail to meet desired yield and quality levels. Furthermore, poor process control can significantly increase costs due to increased raw material usage, labor costs and the like. Accordingly, in an effort to gain improved process control, many manufacturers seek to develop computational models or simulations for the manufacturing process. A modeling expert, for example, may develop computational models using a variety of tools and a variety of modeling techniques. The modeling techniques may include, for example, finite element analysis, finite difference analysis, neural networks, linear regression, partial least squares (PLS), principal component analysis, and the like.

SUMMARY

In general, the invention provides for the creation and execution of accurate models for the manufacture of complex, multi-layered materials using one-dimensional numerical techniques. More specifically, the techniques may be used to calculate variations of a process parameter, such as temperature, associated with the material during the manufacturing process.

In one embodiment, a method comprises receiving segment data that partitions a process to manufacture a material into a set of segments having one or more layers. For example, the segment data may partition the process along a path traversed by the material. The segment data may define, for example, layers of the material, as well as layers of components within the process that may contact the material, such as rollers and belts. The method further comprises receiving curvature data for the layers, and calculating values for a process parameter through thicknesses of the layers as a function of the curvature data. The method may comprise invoking a one-dimensional model, such as a one-dimensional finite difference model, to calculate the values for the defined segments and layers. In this manner, one-dimensional modeling techniques can be used to model the manufacture of a complex, multi-layered material.

In another embodiment, a system comprises a user interface to receive segment data defining a manufacturing process and partitioning the manufacturing process into a set of segments having layers. The user interface further receives curvature data describing the curvature of each layer relative to a material that traverses a path through the manufacturing process. The system further comprises a computational engine to calculate values for a process parameter through a thickness of each layer as a function of the curvature data.

In another embodiment, a computer-readable medium comprises instructions to cause a processor to present a user-interface to receive data from a user. The received data comprises segment data that partitions a manufacturing process into a set of segments having one or more layers, and curvature data that describes the curvature of the layers relative to a material that traverses a path through the manufacturing process. The medium further comprises instructions to calculate values for a process parameter through a thickness of the layers of each segment as a function of the curvature data.

The invention may be capable of providing one or more advantages. For example, as described herein, the one-dimensional modeling techniques can be used to model the manufacture of a complex, multi-layered material. These techniques may be substantially faster and more accurate than more complex techniques, such as multi-dimensional finite-element analysis. Accordingly, the techniques may be used offline to describe and model a manufacturing process, or may be integrated within a manufacturing environment to provide real-time control of the manufacturing process.

Furthermore, the techniques may be used to model the manufacture of any material having a thickness that is substantially smaller than its length and width, such as a web, a film, a sheet, and the like. The techniques can be readily applied to any process parameter that may vary through the thickness of material, such as tension, strain, cure rate, solvent fraction, crystallinity, or the like.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 11 illustrates an example window with which the user describes other components within the manufacturing process that may influence the process parameter being modeled.

DETAILED DESCRIPTION

Figure 1:
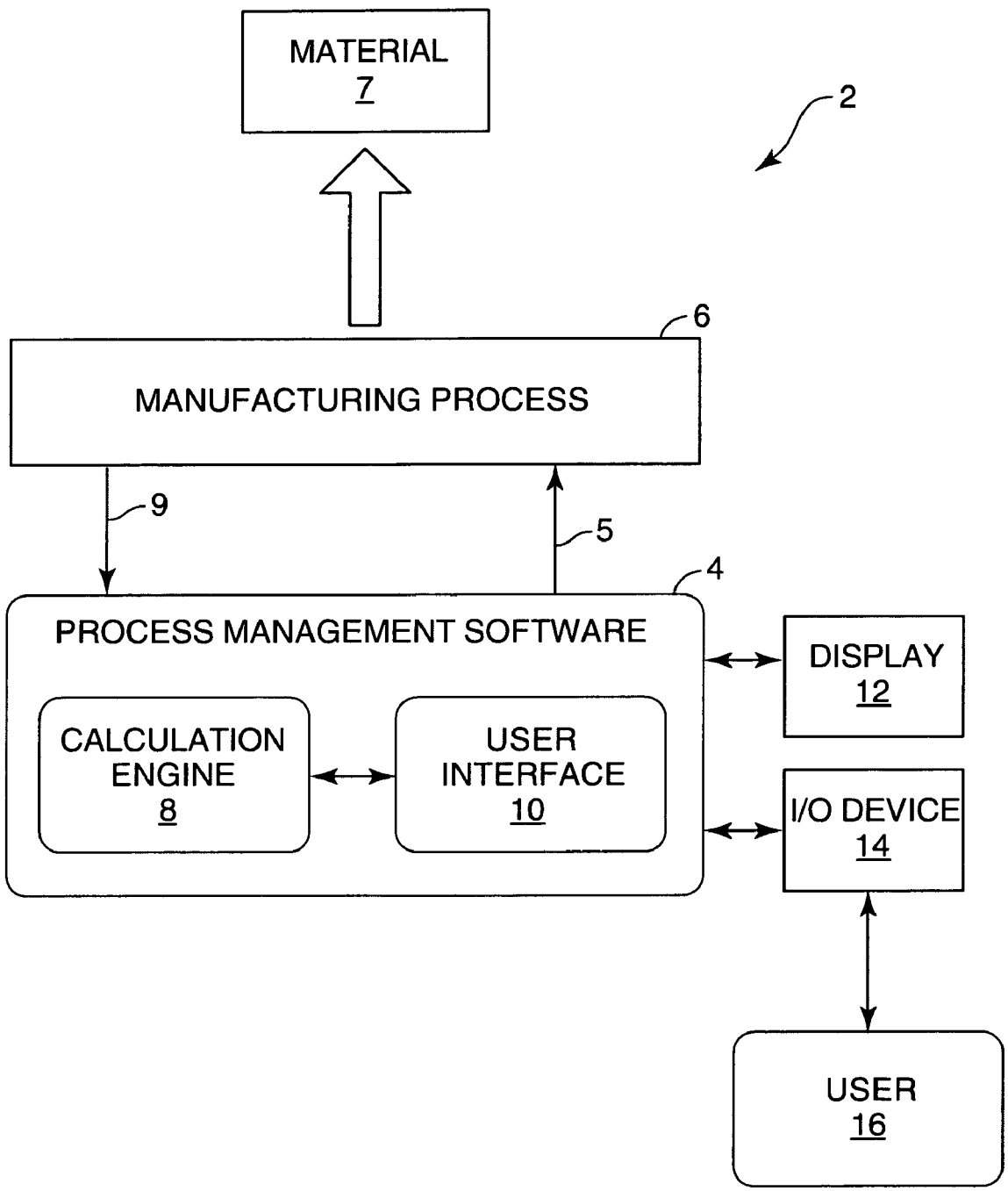
FIG. 1 is a block diagram illustrating an example system in which process management software incorporates a calculation engine for invoking a one-dimensional model to calculate variations of a process parameter within a complex, multi-layered material.

FIG. 1 is a block diagram illustrating an example system 2 in which process management software 4 incorporates a calculation engine for calculating variations of a process parameter within material 7 during a manufacturing process 6. In particular, calculation engine 8 provides for the creation and execution of accurate models for the manufacture of complex, multi-layered materials using one-dimensional numerical techniques.

Material 7 may comprise any one of a number of different types of material having a thickness that is substantially smaller than its length and width. Material 7 may comprise, for example, a web, a film, a sheet, or the like. Although the techniques are described herein in reference to modeling variations of temperature through the thickness of material 7, the techniques may readily be applied to other process parameters, such as tension, strain, cure rate, solvent fraction, crystallinity, and the like.

In general, process management software 4 executes within a computing environment provided by a computing device, such as a workstation or specific process control hardware. Process management software 4 provides signals 5 to manage manufacturing process 6 in order to produce material 7. Based on the calculated values for one or more process parameters, process management software 4 may control data, thresholds, target levels and other information for use by manufacturing process 6. In addition, process management software 4 may monitor and record process data 9, which may include data indicative of a wide variety of process variables such as temperatures, processing times, speeds, thicknesses, flow rates, concentrations, weights and the like.

As described in detail below, user interface 10 allows user 16, such as a modeling engineer, to provide segment data that partitions manufacturing process 6 into one or more discrete segments such that variation within material 7 can be modeled using one-dimensional numerical methods. In particular, the user can define the segments of manufacturing process 6 along a path traversed by material 7, and according to one or more rules of calculation engine 8. User 16 may provide segment data to define new segments along a path traversed by material 7 when a boundary condition for at least one surface of the material changes. For example, user 16 may define a new segment each time the surface of material 7 contacts a new component of manufacturing process 6, such as a bath or roller, along the path. As another example, user 16 may define a new segment of material 7 when a second material is layered upon a surface of material 7.

For each segment, user 16 can provide a variety of information including boundary condition data for a surface of the material, such as an average speed of material 7, and average thickness of the material, as well as boundary conditions for one or more surfaces of the material, and the like. In addition, the segment data provided by user 16 describes any layers that are introduced within the segment, and that must be considered by the one-dimensional numerical methods. For example, the data may describe layers of material 7 itself, layers of components of manufacturing process 6, or any combination thereof. For each layer, the data may describe a thickness, a material of the layer, initial conditions, and the like.

Furthermore, user 16 may provide data that describes any curvature experienced by the defined layers. In general, the curvature data describes angular changes to a surface profile for each layer relative to the path traversed by material 7. In this manner, the curvature data addresses any change to the surface profile of a layer when material 7 experiences a change in direction, such as when contacting a rotating component. The curvature data may, for example, specify a radius of an arc traversed by the layer. For each layer, user 16 may provide an outside diameter of a rotating component contacted by the material, a position of the component relative to material 7, a wrap angle, a begin angle, an end angle, and the like. For some layers, the curvature data will reflect the fact that the layer does not experience a change in direction relative to the path being traversed.

Calculation engine 8 applies one-dimensional numerical methods to accurately calculate the effects of the curvature on the variation in the process parameter through the described layers. Calculation engine 8 applies one-dimensional numerical methods that model the variations of the process parameter, such as variations in temperature, through the thicknesses of the layers, and that recognize that other variations are likely caused by local edge effects in boundary conditions of the layers. In other words, calculation engine 8 applies techniques that recognize that the thickness of each layer may dominate with respect to the edge effects of the process parameter within material 7. In one embodiment, calculation engine 8 invokes a finite difference model to calculate values for the process parameter for a set of locations through the layers. As described in detail, calculation engine 8 makes use of the curvature data to more accurately model the variations of the process parameter than in the case where curvature of the layers was either approximated, or not considered. Calculation engine 8 may, for example, calculate ratios of the thicknesses of the layers to the radius of the arc defined by the curvature data, and may make use of the calculated ratios upon invoking the model.

Based on the calculated values for the process parameter, process management software 4 controls manufacturing process 6. In addition, user interface 10 may present the calculated process parameters to user 16 via display 12. By interacting with input/output (I/O) device 14, user 16 can adjust and refine various inputs to the model. In particular, as illustrated below, user interface 10 may display a number of I/O controls, such as slide bars, toggle switches, or data entry fields by which user 16 can adjust curvature data, segment data, boundary conditions, and the like.

Although illustrated as part of process management software 4 for providing real-time control of manufacturing process 6, calculation engine 8 and user interface 10 may readily be used off-line to model manufacturing process 6. In this manner, calculation engine 8 and user interface 10 need not be integrated within a manufacturing environment.

Figure 2A:
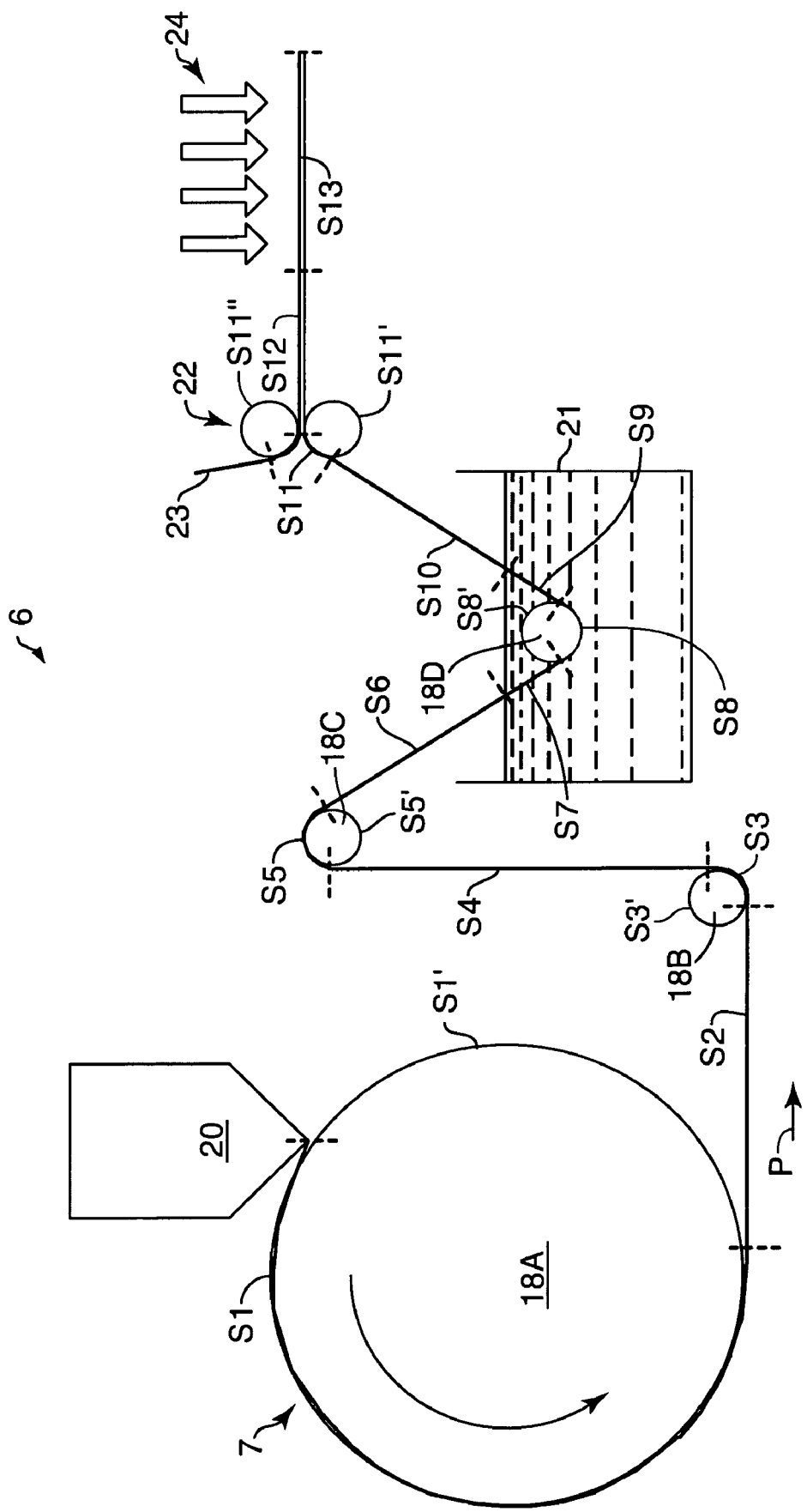
FIG. 2A is a schematic diagram illustrating an example manufacturing process partitioned into a plurality of segments.

FIG. 2A is a schematic diagram illustrating a partitioning of an example manufacturing process 6 into a plurality of segments. In particular, a new segment is defined along the path P when a boundary condition for at least one surface of material 7 changes. For example, a boundary condition for a surface of material 7 may change when the surface of material 7 contacts a new component of manufacturing process 6, such as a rollers 18A–18D or air jets 24. Another example of a change in boundary conditions is the layering of a second material upon the surface of material 7, such as the laying or coating of material 23 on material 7 by nip rollers 22, e.g., as in a lamination process. Transitions between segments are illustrated within FIG. 2 by dashed lines.

For example, manufacturing process 6 is partitioned into a first segment S1 that begins at the source of material 7, e.g., the application of material 7 to roller 18A from die 20. Segment S2 begins when material 7 leaves roller 18A, causing a change in a boundary condition for a surface of material 7. Segment S2 terminates and segment S3 begins when a leading edge of material 7 contacts roller 18B. Segment S4 begins at the point that a trailing edge of material 7 leaves roller 18B.

Similarly, roller 18C introduces two new segments S5 and S6. Segment S7 begins at the point where material 7 contacts liquid bath 21. Roller 18D, located within bath 21, results in segments S8 and S9. Segment S10 starts at the point where material 7 leaves bath 21. Segment S11 starts when material 7 contacts nip roller 22. Segment S12 starts when an additional material 23 is layered upon material 7 by nip roller 22. Finally, segment S13 starts when material 7 and material 23 reach air jets 24.

In addition, segments may be defined to model the non-contacting-portions of rollers 18. For example, segment S1' is defined to model the non-contacting portion of roller 18A. Similarly, segments S3', S5', S8', S11' and S11" model the non-contacting portions of rollers 18B, 18C, 18D, and nip rollers 22, respectively. In this manner, calculation engine 8 takes into account changes in the process parameter that may occur due to conditions of the non-contacting portion of the rollers.

In some situations, a rotating component may impact a plurality of segments. Accordingly, for more complex manufacturing processes, one or more sets of cycling segments can be defined.

Figure 2B:
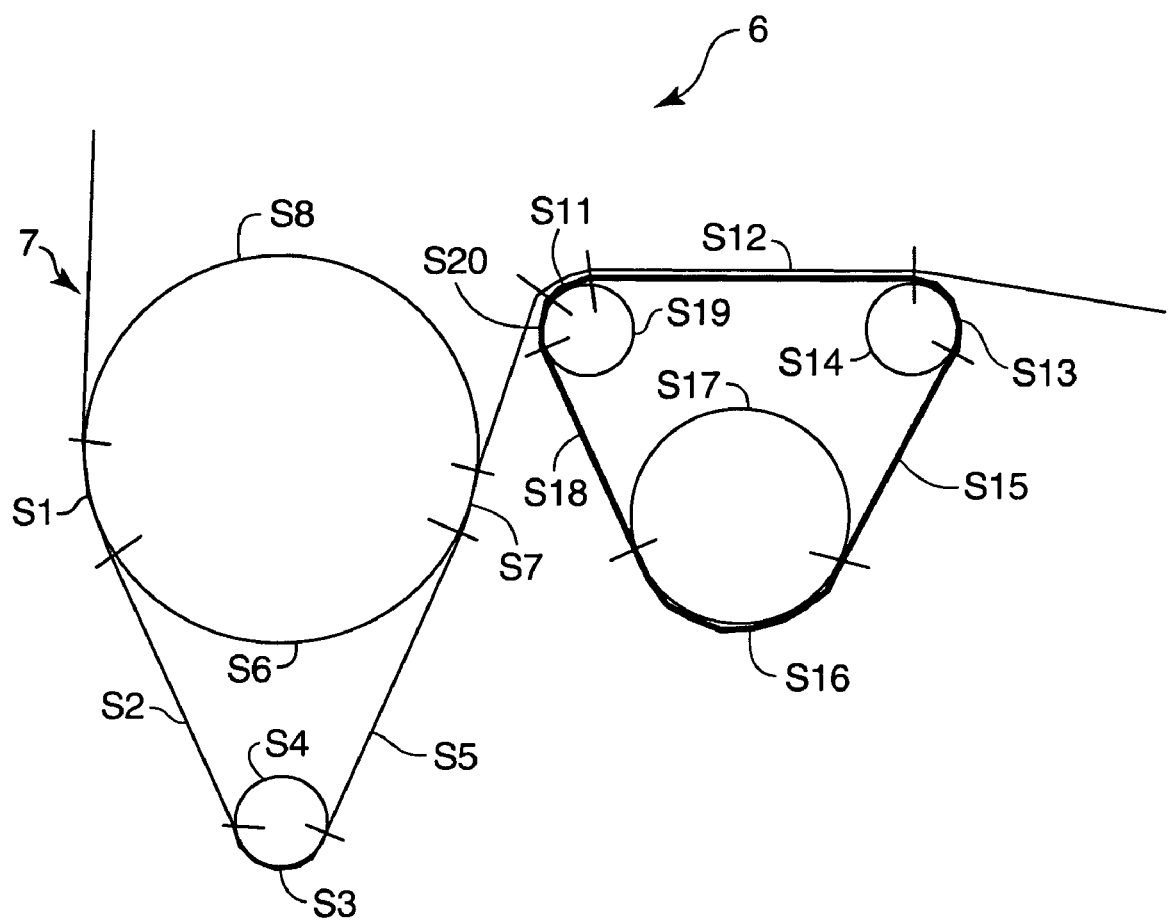
FIG. 2B is a schematic diagram illustrating another example manufacturing process partitioned into a plurality of segments.

FIG. 2B is a schematic diagram illustrating a partitioning of another example manufacturing process 6 into a plurality of segments. In particular, FIG. 2B illustrates two exemplary situations where complex sets of cycling segments may be defined. For example, segments S1–S8 form a set of cycling segments. Segments S1–S8 can be viewed as cycling in the sense that the process parameter, such as temperature, within the first segment, e.g., S1, is influenced by the process parameter of one or more of the other segments, e.g., S8, as material 7 traverses the set of segments. As another example, material 7 contacts a belt that wraps around three rollers having different diameters. In this example, segments S11–S20 form a set of cycling segments.

FIGS. 2A, 2B illustrate the principle that the introduction of a rotating member to the path of material 7 results in the definition of one or more new segments. However, new segments need not necessarily be defined for members that do not substantially influence the process parameter. For example, calculation engine 8 may accurately model temperature variations within material 7 without defining new segments for rotating members that quickly heat to the temperature of material 7.

Figure 3A:
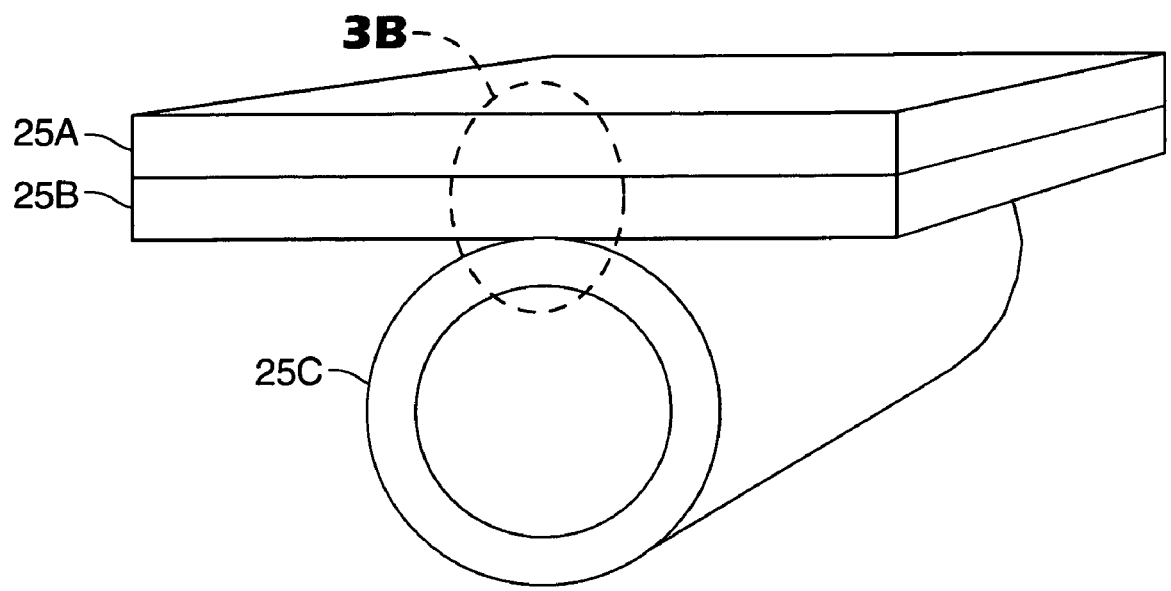
FIG. 3A is a schematic diagram illustrating an example segment of a multiple layered article on a roller.
Figure 3B:
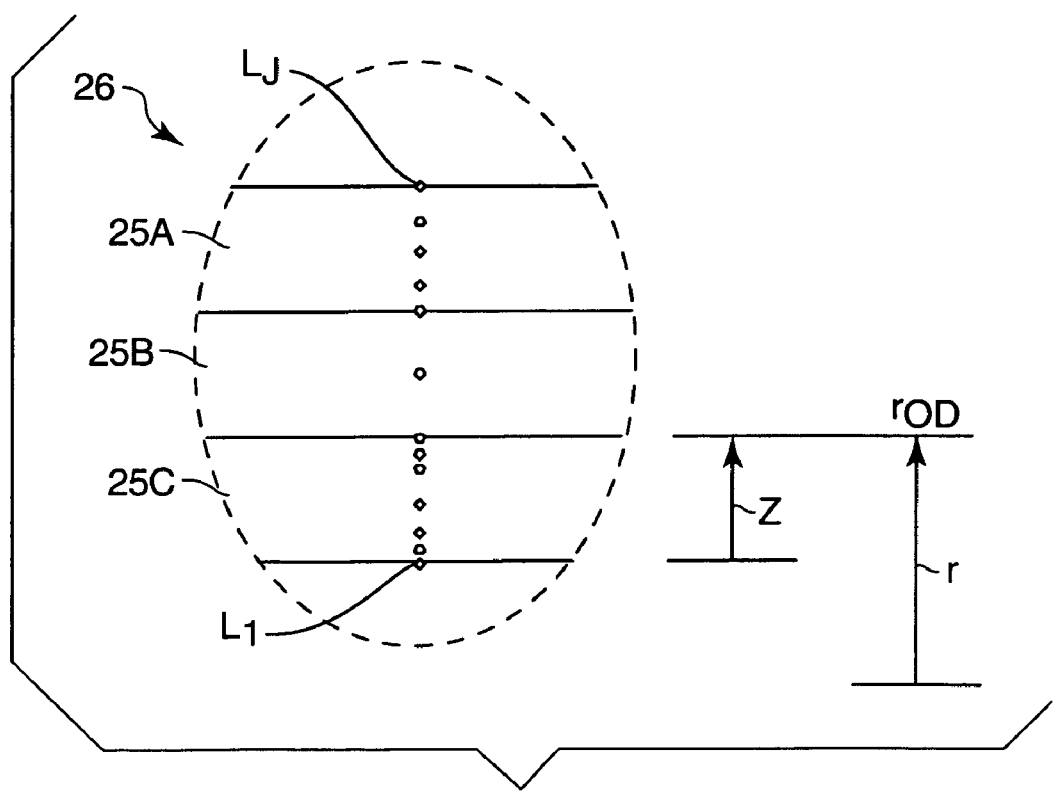
FIG. 3B is a schematic diagram illustrating a finite difference grid through the example segment having multiple layers highlighted in FIG. 3A.

FIGS. 3A and 3B are schematic diagrams illustrating a finite difference grid defined by calculation engine 8 through an example segment 26 of a manufacturing process modeled to include multiple layers 25A–25C (herein layers 25). In particular, a material having layers 25A, 25B is moved by temperature controlled roller 25C. Accordingly, segment 26 is defined to include three layers 25A, 25B, 25C (herein layers 25).

In response to segment data describing exemplary segment 26, calculation engine 8 defines the grid to include a set of locations $L_1$ through $L_J$ (herein locations L) along a direction Z that is aligned with the thickness of layers 25A, 25B and roller 25C. The locations L may be unequally-spaced to allow calculation engine 8 to capture steep gradients of the process parameter near the boundaries of the of layers 25, and to define different spacing within layers 25. In this example, calculation engine 8 subdivides layers 25 of segment 26 into five, three, and seven locations, respectively, resulting in a total of 15 locations, 13 of which are unique.

To calculate values for a process parameter at locations L, calculation engine 8 invokes one-dimensional numerical methods that recognize that other variations are likely caused by local edge effects in boundary conditions of the layers. Accordingly, an energy equation for heat conduction through the layer can be written as:

$$\rho C_p \frac{DT}{Dt} = \frac{\partial}{\partial z}\left(k \frac{\partial T}{\partial z}\right) + \dot{G} \tag{1A}$$

Making use of curvature data, the equation can be written as:

$$\rho C_p \frac{DT}{Dt} = \frac{1}{r} \frac{\partial}{\partial r}\left(r \cdot k \frac{\partial T}{\partial r}\right) + \dot{G} \tag{1B}$$

where $\rho$, k and $C_p$ are constant within each layer, and r represents a radius of an arc traversed by the layer along the path of material 7. As illustrated in FIG. 3B, r may be specified as a radius to an outside diameter $r_{OD}$ of a rotating component. The numerical methods below describe a new formulation allowing (1A) and (1B) to be solved interchangeably. Initial conditions for each layer can be constant, or separate values can be assigned to each location. Boundary conditions can also be assigned to the first and last surfaces of the layers, and can be chosen from several options: a constant surface temperature, convection, or gray body radiation.

$$T_{surface} = T_{wall} \tag{2}$$

$$q = h(T_{surface} - T_\infty) \tag{3}$$

$$q = \epsilon \sigma (T^4_{surface} - T^4_\infty) \tag{4}$$

In these expressions, h is the convection coefficient, $T_\infty$ is the temperature of the surroundings, $\epsilon$ is emissivity, and $\sigma$ is Boltzman's constant. A constant surface temperature boundary condition is actually implemented as convection, with a convection coefficient internally calculated for each time step to ensure a constant surface temperature. The following are typical values for h:

TABLE 1

| | |
|---|---|
| Still room air | 8 W/m²K |
| Parallel air flow | 30 W/m²K |
| Air impingement | 100 W/m²K |
| Turbulent water | 1000 W/m²K |

In some types of heaters, radiation is absorbed by the film internally as well as at the surface. If radiation with intensity, $I_s$ (power per unit area), arrives at the surface, the intensity will fall exponentially depending on the absorption coefficient, $\kappa$ of the layer. This can be expressed in units of reciprocal length as:

$$I = I_s e^{-\bar{\kappa} z} \tag{5}$$

where z is the distance from the surface of the layer. For most materials, the absorption coefficient varies with wavelength, so this average absorption coefficient must be used with some care. The rate of energy absorption (per unit volume) at any position is then given by:

$$G = I_s \bar{\kappa} e^{-\bar{\kappa} z} \tag{6}$$

As illustrated in FIG. 3B, the techniques make use of a finite difference grid through the layers 25. Locations can be numbered from j=1 to jmax in the z direction, and can have coordinates written as $z_j$ and $r_j$. The techniques make use of a Langrangian approach, moving the $z_j$ coordinates with material 7 as the calculations step through a segment.

Using the indices j and k to indicate $z_j$ and $t_k$, the values for the variables can be written as $T_{j,k}$, $k_{j,k}$ and $(\rho Cp)_{j,k}$. Other nodal quantities are written in a similar way.

The energy equation requires a finite difference expression for the conduction term $$\frac{\partial}{\partial z}\left(k\frac{\partial T}{\partial z}\right) \text{ or } \frac{1}{r}\frac{\partial}{\partial r}\left(r \cdot k\frac{\partial T}{\partial r}\right)$$

on an unequally-spaced grid. $k_{j+1/2}$ represents the conductivity at the temperature $(T_{j+1}+T_{j-1})/2$, and $k_{j-1/2}$ is defined similarly. The expression is approximated with a new control volume formulation as:

$$\frac{\partial}{\partial z}\left(k\frac{\partial T}{\partial z}\right)_{j,k} = \frac{A_j k_{j+1/2}\frac{T_{j+1}-T_j}{z_{j+1}-z_j} - A_{j-1}k_{j-1/2}\frac{T_j-T_{j-1}}{z_j-z_{j-1}}}{\frac{1}{2}V_j^+(z_{j+1}-z_j) + \frac{1}{2}V_j^-(z_j-z_{j-1})} \tag{7}$$

where three new quantities representing the relative nodal area and elemental volumes are introduced:

$$A_j = 1 \text{ when a layer is flat, but } A_j = \frac{r_{j+1}+r_j}{r_{OD}} \text{ when curved} \tag{8a}$$

$$V_j^+ = 1 \text{ when a layer is flat, but } V_j^+ = \frac{r_{j+1}+3r_j}{4r_{OD}} \text{ when curved} \tag{8b}$$

$$V_j^- = 1 \text{ when a layer is flat, but } V_j^- = \frac{r_{j-1}+3r_j}{4r_{OD}} \text{ when curved} \tag{8c}$$

Note that (7) is written in terms of position differences so that $z_j$ and $r_j$ are interchangeable in the equation (e.g. $z_j - z_{j-1} = r_j - r_{j-1}$). In this way the goal of seamlessly combining curved and flat layers in one set of equations can be accomplished.

Because the conductivity values can be evaluated between the locations, there is no need for computing average conductivity at the interfaces. The energy equation uses a fully implicit treatment of the time derivative. With these features, the energy equation becomes $$(\rho C_p)_j \left[\frac{T_{j,k}-T_{j,k-1}}{Dt}\right] = \frac{\partial}{\partial z}\left(k\frac{\partial T}{\partial z}\right)_{j,k} + \dot{G}_j \tag{9}$$

At interfaces the average value of $(\rho C_p)_j$ can therefore be calculated as:

$$(\rho C_p)_j = \frac{(\rho C_p)_{j+1/2}\frac{1}{2}V_j^+(z_{j+1}-z_j) + (\rho C_p)_{j-1/2}\frac{1}{2}V_j^-(z_j-z_{j-1})}{\frac{1}{2}V_j^+(z_{j+1}-z_j) + \frac{1}{2}V_j^-(z_j-z_{j-1})} \tag{10}$$

A further interface condition may also be considered. When two layers are brought together, the surface temperature can be averaged so that the total energy is conserved. For two layers a and b, this average contact temperature can be written as:

$$T_{contact,j} = \frac{(\rho C_p)_{j+1/2}\frac{1}{2}V_j^+(z_{j+1}-z_j)T_{a,j} + (\rho C_p)_{j-1/2}\frac{1}{2}V_j^-(z_j-z_{j-1})T_{b,j}}{(\rho C_p)_{j+1/2}\frac{1}{2}V_j^+(z_{j+1}-z_j) + (\rho C_p)_{j-1/2}\frac{1}{2}V_j^-(z_j-z_{j-1})} \tag{11}$$

Equation (7) can then be substituted for the conduction term. Heat generation can occur from either the bottom or top surface of the layer, or both, and can be modeled as:

$$\dot{G}_j = \frac{I_{\text{bottom\_surface}}}{\frac{1}{2}(z_{j+1}-z_{j-1})}\left[e^{-\frac{1}{2}\bar{\kappa}(z_j+z_{j-1})} - e^{-\frac{1}{2}\bar{\kappa}(z_{j+1}+z_j)}\right] \tag{12}$$

$$\dot{G}_j = \frac{I_{\text{top\_surface}}}{\frac{1}{2}(z_{j+1}-z_{j-1})}\left[e^{-\frac{1}{2}\bar{\kappa}(z_{jmax}^2-z_{j+1}-z_j)} - e^{-\frac{1}{2}\bar{\kappa}(z_{jmax}^2-z_j-z_{j-1})}\right] \tag{13}$$

At the surfaces these expressions can be altered to correctly include the boundary conditions:

$$\frac{\partial}{\partial z}\left(k\frac{\partial T}{\partial z}\right)_{j=1,k} = \frac{A_j k_{j+1/2}\frac{T_{j+1}-T_j}{z_{j+1}-z_j} - h(T_j - T_\infty)}{\frac{1}{2}V_j^+(z_{j+1}-z_j)} \tag{14}$$

$$\dot{G}_{j=1} = \frac{G_{\text{bottom\_surface}}}{z_{j+1}-z_j}\left[1 - e^{-\frac{1}{2}\bar{\kappa}(z_{j+1}+z_j)}\right] \tag{15}$$

Similar adjustments can be made for the last surface (j=jmax). When gray body radiation is desired, (14) becomes $$\frac{\partial}{\partial z}\left(k\frac{\partial T}{\partial z}\right)_{j=1,k} = \frac{A_j k_{j+1/2}\frac{T_{j+1}-T_j}{z_{j+1}-z_j} - \varepsilon\sigma(T_j^4 - T_\infty^4)}{\frac{1}{2}V_j^+(z_{j+1}-z_j)} \tag{16}$$

A constant temperature boundary condition can be implemented in similar fashion as (15), but with a convection coefficient calculated sufficiently large to give a local Biot number of 300: $h=300 \sqrt{k\rho C_p/\Delta t}$.

The total energy change of each layer for a segment can be calculated by comparing heat content at the start and end of the segment. Surface heat transfer is computed at the end of each step within a segment. Accordingly, the calculation engine 8 can invoke the one-dimensional numerical techniques described above to accurately calculate values for a process parameter through the layers. In this manner, calculation engine 8 can accurately model the manufacture of complex, multi-layered materials.

Figure 4:
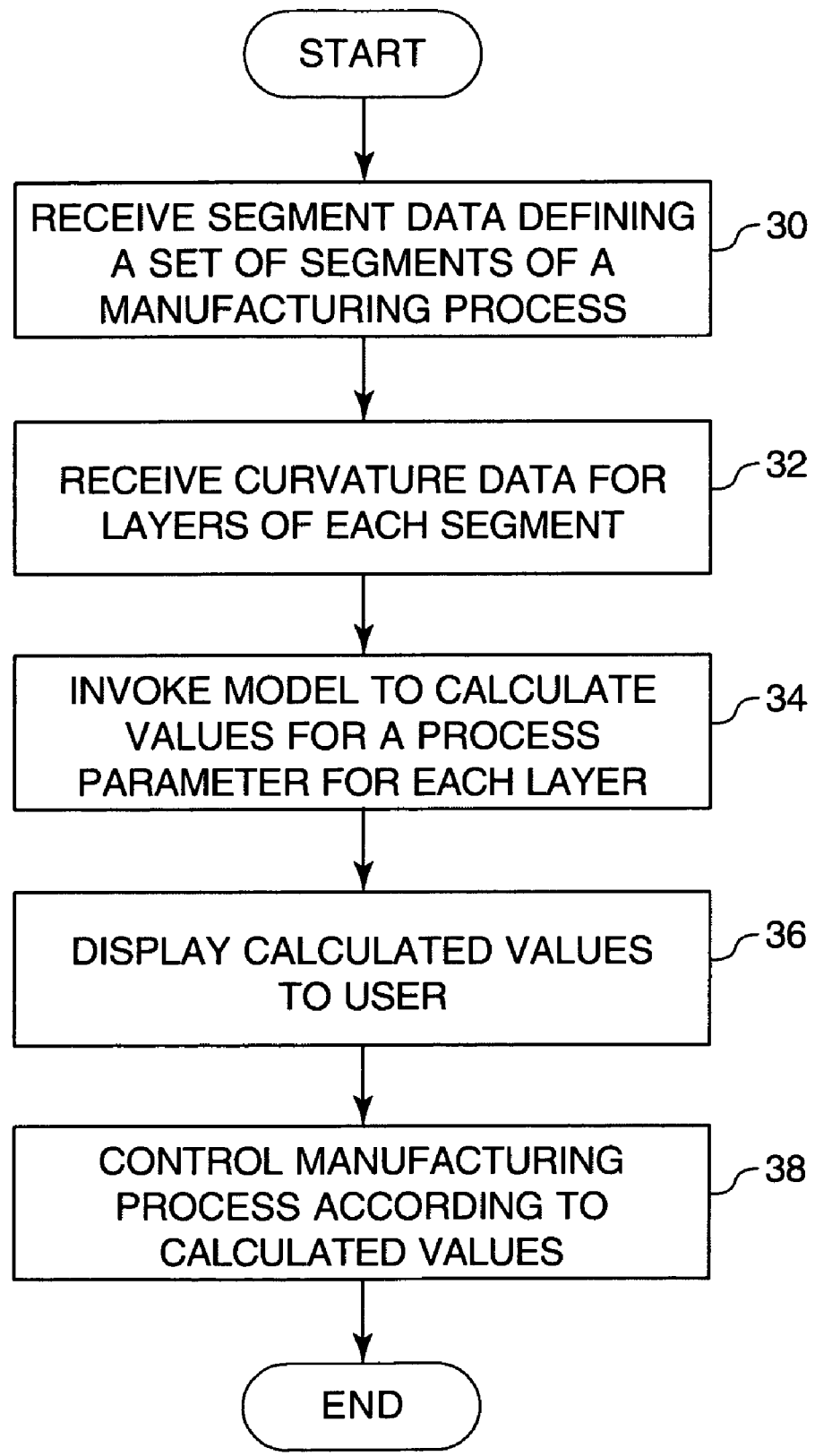
FIG. 4 is a flowchart illustrating an example mode of operation of the process management software and the calculation engine.

FIG. 4 is a flowchart illustrating an example mode of operation of process management software 4 and, in particular, calculation engine 8 to apply the numerical techniques described above. Initially, calculation engine 8 receives segment data from user interface 10 (30). The segment data partitions manufacturing process 6 into one or more discrete segments such that variation within material 7 can be modeled using one-dimensional numerical methods as described above. For each segment, the segment data describes a variety of information including segment type, segment name, average line speed, average line width, temperature above the segment, convection coefficient above the segment, temperature below the segment, convection coefficient below the segment, and the length of the segment. Furthermore, the segment data describes any layers that are introduced within the segment and that must be considered by the one-dimensional numerical methods. For example, the segment data may define one or more layers of material, as well as layers introduced by manufacturing elements that may contact the material, such as rollers.

In addition, the calculation engine receives data that describes any curvature to the layers introduced by the segment data (32). In general, the curvature data describes angular changes to a surface profile for each layer relative to the path traversed by material 7. The curvature data may, for example, specify a radius of an arc traversed by the layer. For each layer, user 16 may provide an outside diameter of a rotating component contacted by the material, a position of the component relative to material 7, a wrap angle, a begin angle, an end angle, and the like. For some layers, the curvature data will reflect the fact that the layer does not experience a change in direction relative to the path being traversed. The following exemplary segment data and curvature data defines two segments S1, S2. The first segment introduces a single layer for the material, e.g., a polyester melt, while the second segment introduces a layer for a casting wheel that carries the polyester melt. The curvature data for the casting wheel describes the outside diameter of the wheel, as well as the wrap angle for the wheel.

| SEGMENT 1 | |
|---|---|
| TYPE: | SPAN |
| NAME: | CURTAIN |
| AVERAGE LINE SPEED: | 13.7 M/MIN |
| AVERAGE LINE WIDTH | 0.747 M |
| TEMPERATURE ABOVE: | 23 C. |
| CONVECTION COEFFICIENT ABOVE: | 10 W/M^2 |
| TEMPERATURE BELOW: | 23 C. |
| CONVECTION COEFFICIENT BELOW: | 10 W/M^2 |
| PLOTTING POINTS: | 19 |
| LENGTH: | 0.05 M |
| LAYER 1: | |
| NAME: | PET SHEET |
| THICKNESS | 2.3 MM |

| -continued | |
|---|---|
| STARTING TEMPERATURE: | 302 C. |
| MATERIAL | POLYESTER MELT |
| SEGMENT 2 | |
| TYPE: | ROLLER |
| ROLLER POSITION: | BELOW |
| NAME: | CASTING ROLL |
| AVERAGE LINE SPEED: | 13.7 M/MIN |
| AVERAGE LINE WIDTH | 0.747 M |
| TEMPERATURE ABOVE: | 23 C. |
| CONVECTION COEFFICIENT ABOVE: | 10 W/M^2 |
| TEMPERATURE BELOW: | 35 C. |
| CONVECTION COEFFICIENT BELOW: | 1000 W/M^2 |
| PLOTTING POINTS: | 19 |
| OUTSIDE DIAMETER: | 1.0 M |
| WRAP ANGLE: | 90 DEGREES |
| ROLLER LAYERS: | 1 |
| LAYER 1: | |
| NAME: | SHELL |
| THICKNESS | 15.2 MM |
| STARTING TEMPERATURE: | 35 C. |
| MATERIAL | STEEL |

After receiving segment data and curvature data, such as the data illustrated above, calculation engine 8 invokes one-dimensional numerical techniques to accurately calculate values for a process parameter through the thickness of the defined layers based on the segment data and the curvature data for the layers (34). User interface 10 may display the calculated values to the user (36). In addition, process management software 4 may control manufacturing process 6 in accordance with the calculated values for the segments (38), e.g., by controlling speed, pressure, volume, or flow rate of material 7.

Figure 5:
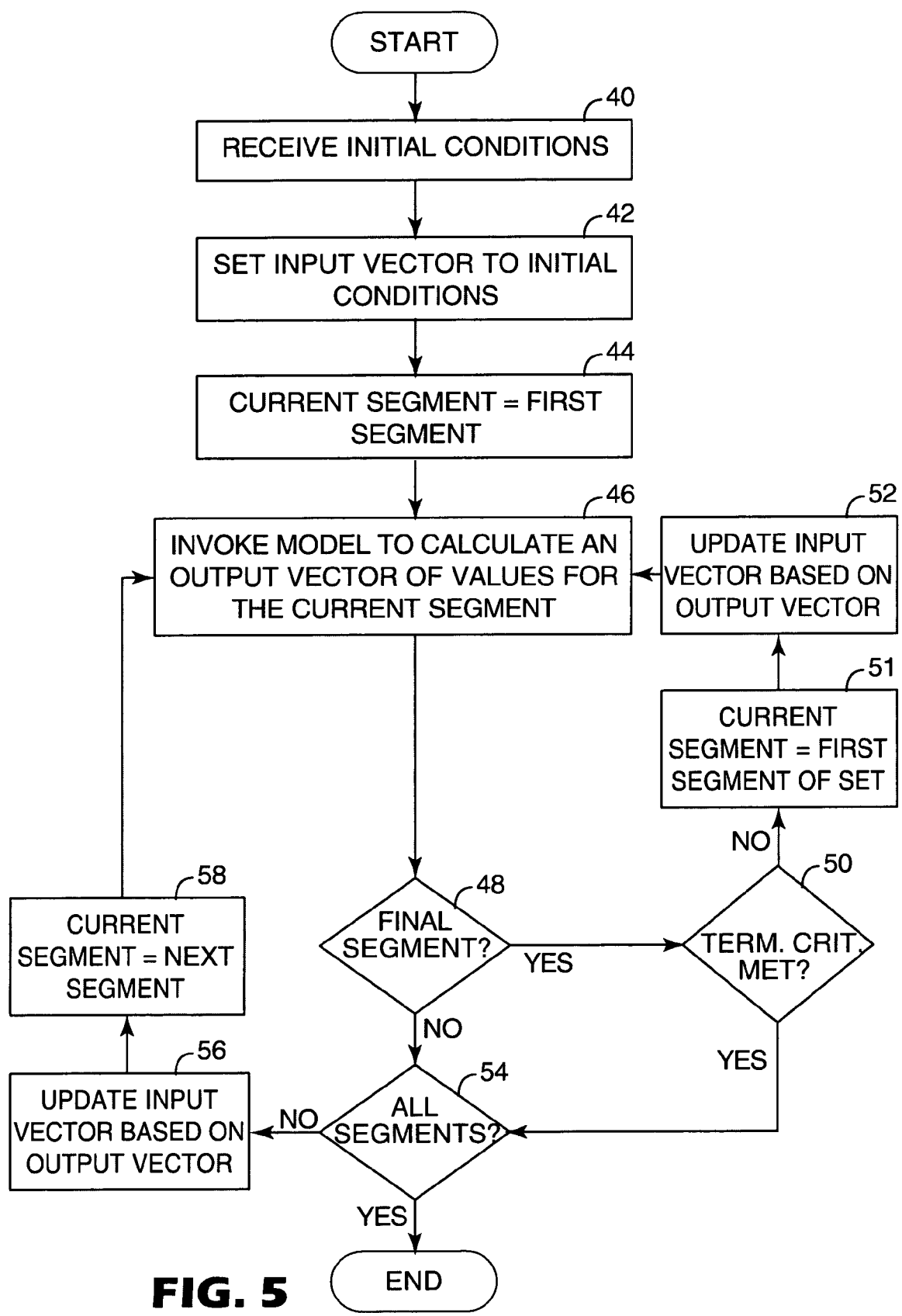
FIG. 5 is a flowchart further illustrating the application of one-dimensional numerical methods to model the manufacture of a complex, multi-layered material.

FIG. 5 is a flowchart further illustrating the application of one-dimensional numerical methods to model the manufacture of a complex, multi-layered material. Initially, calculation engine 8 receives initial conditions for the manufacturing process (40). For example, user 16 may provide initial input temperatures for the locations defined within a first segment of the set of segments. Calculation engine 8 initializes the model by setting an input vector based on the initial conditions provided by user 16 (42), and setting a current segment counter to the first segment (44).

Next, calculation engine 8 invokes the one-dimensional model to calculate an output vector of predicted values of the process parameter, such as temperature, through the layers defined for the current segment (46). As described above, calculation engine 8 may invoke a one-dimensional finite difference expression to calculate values at a grid of locations through the layers.

After calculating the output vector of values, calculation engine 8 may calculate steady state values by determining whether the segment data for the current segment defines a final segment for a set of cycling segments (48). If so, calculation engine 8 determines whether termination criteria have been satisfied for the set (50). If not, calculation engine 8 sets the current segment to the first segment in the set (51), and sets the input vector based on the output vector (52). Calculation engine 8 repeatedly invokes the model until the termination criteria have been met. For example, calculation engine 8 may determine whether changes within the predicted values between iterations have fallen below a predefined threshold. As another example, when modeling temperature variations through the layers, calculation engine 8 may determine whether the total heat leaving the rotating component is within a predefined threshold of a total heat entering the rotating component.

When termination criteria have been satisfied (yes branch of 50), or if the segment is not the final segment in a cycle of segments (no branch of 48), calculation engine 8 determines whether all segments have been modeled (54). If not, calculation engine 8 sets the input vector for the next segment based on the output vector of the current segment (56), and then updates the current segment counter to the next segment along the path (58). Calculation engine 8 repeats the modeling techniques for each segment until all of the segments have been modeled.

Figure 6:
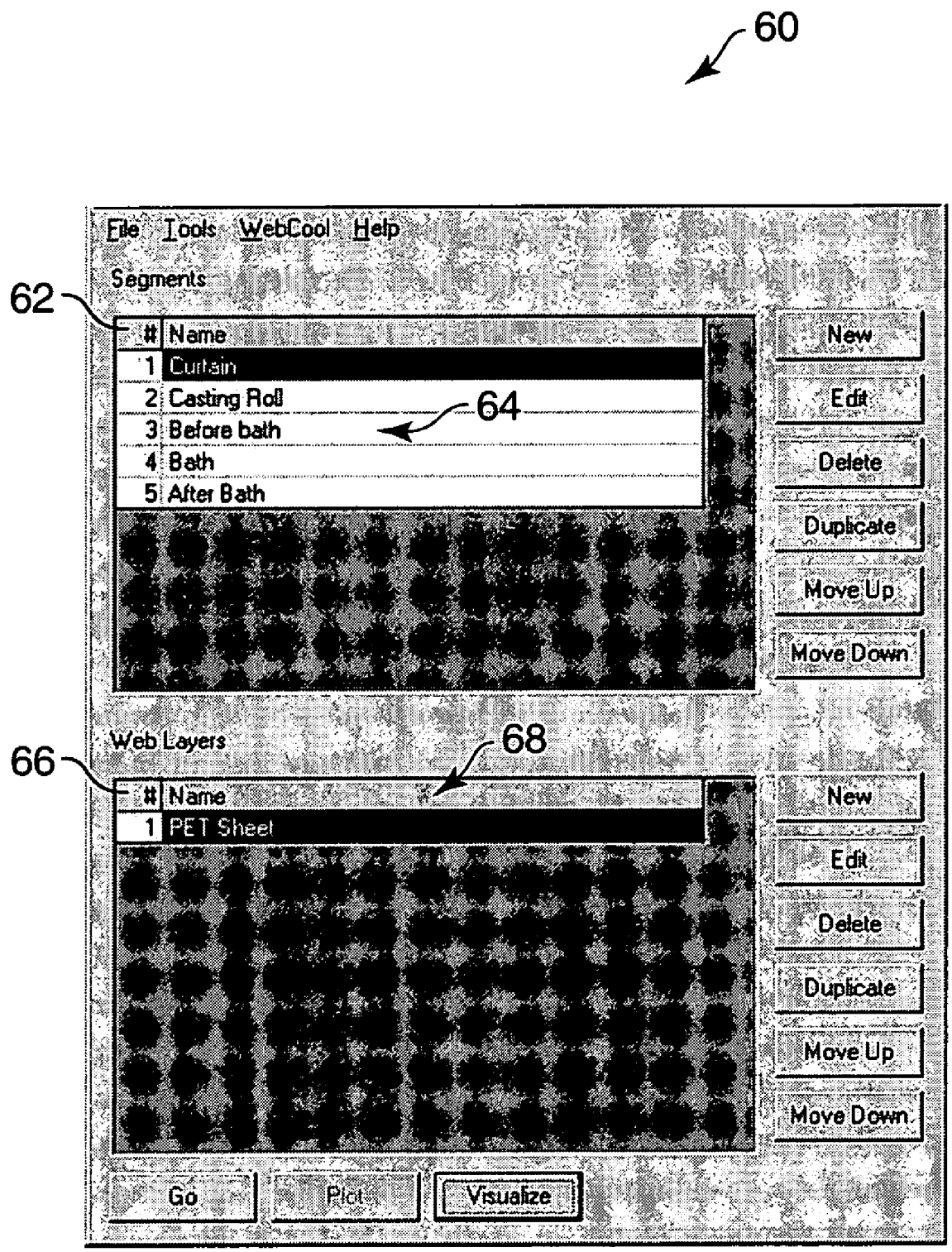
FIG. 6 illustrates an example window presented by a user interface with which a user interacts to define a manufacturing process having one or more segments.

FIG. 6 illustrates an example window 60 presented by user interface 10 with which user 16 interacts to define a manufacturing process having one or more segments. In the example, user 16 has entered segment data within input area 62 to partition the process into five segments 64. In addition, window 60 includes a second input area 66 with which user 16 interacts to describe one or more layers 68 of material 7.

Figure 7:
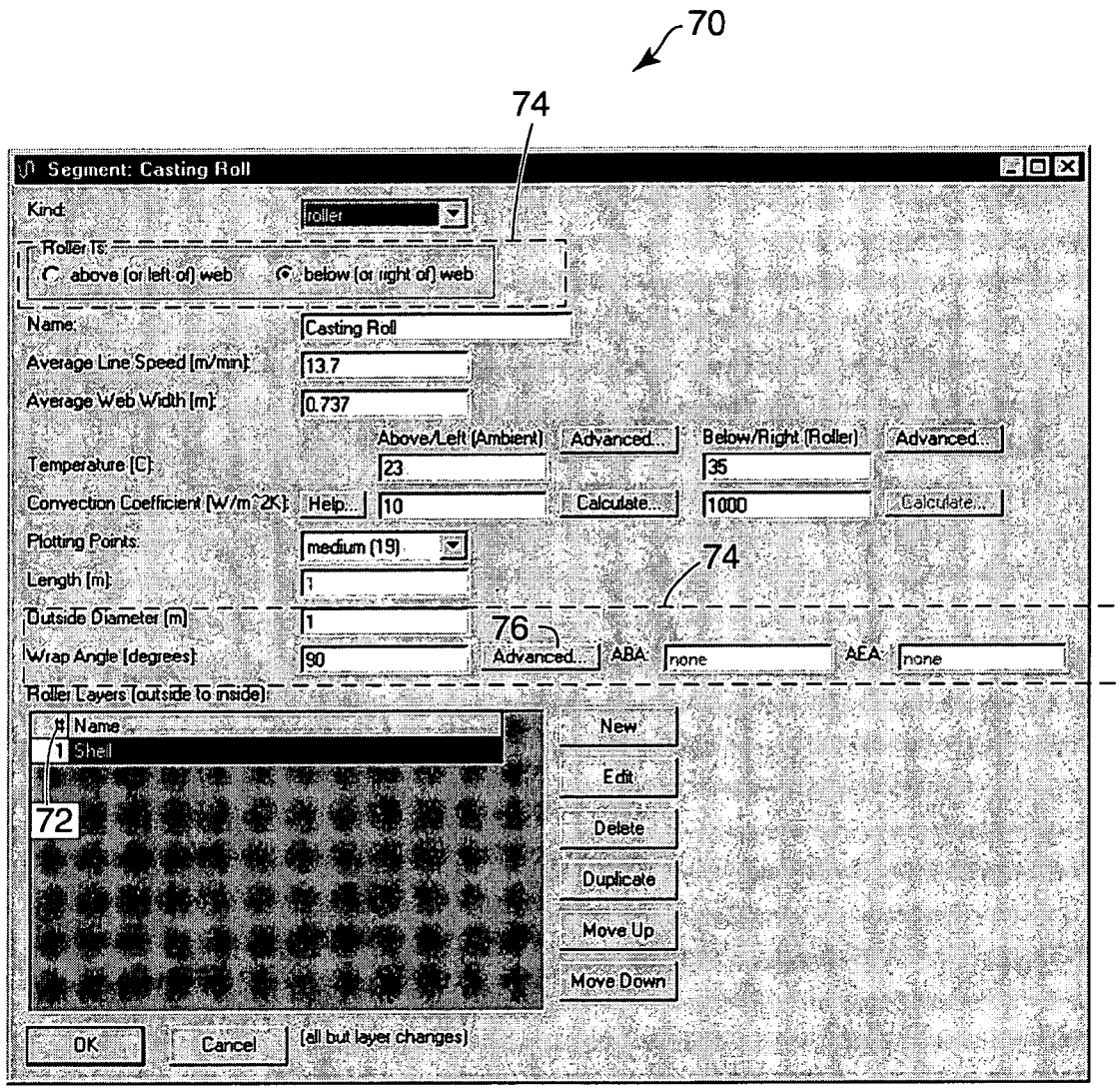
FIG. 7 illustrates an example window with which the user provides more detailed data for a particular segment.

FIG. 7 illustrates an example window 70 presented by user interface 10 with which user 16 interacts to provide more detailed data for a particular segment. In the illustrated example, user 16 has entered segment data for a current segment named ROLLER that includes a rotating member. The segment data captured by window 70 for the rotating member may include a position of the rotating member relative to material 7, a name for the member, an average line speed and width for material 7 within the segment, the boundary temperatures and convection coefficients above and below the segment, a number of plotting points for the segment, and a length for the segment. In addition, window 70 captures segment data that describes any layers 72 introduced by the segment, such as a shell of the rotating member.

Figure 8:
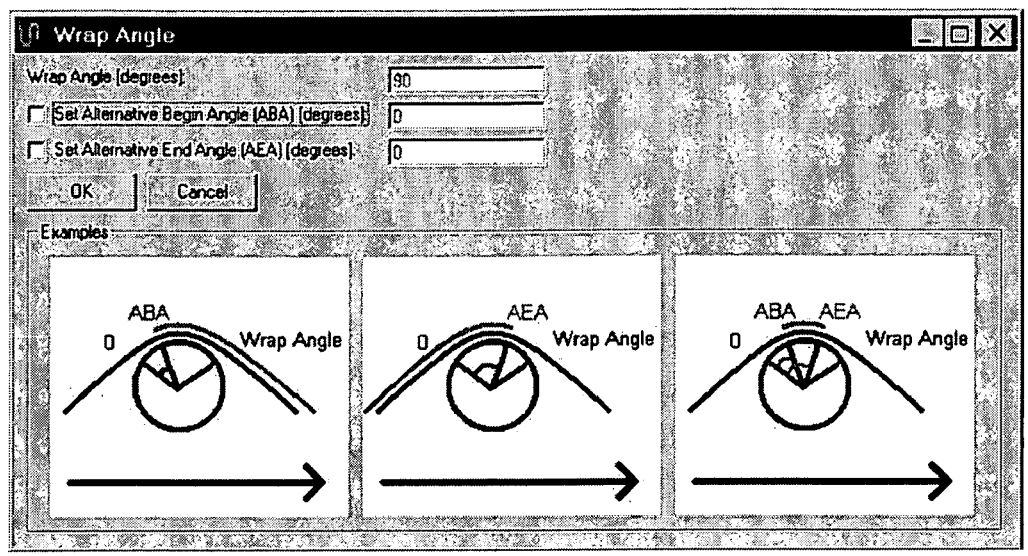
FIG. 8 illustrates an example window with which the user may provide additional curvature data for a selected layer.

In addition, window 70 includes input areas 74 with which the user interacts to provide additional data that describes the curvature of the layers with respect to the path traversed by material 7 through manufacturing process 6. For example, user 16 may enter curvature data that includes a wrap angle for a layer traversing an arc around a rotating member, an outside diameter of a rotating component, a begin angle for a new layer, an end angle for a current layer, and the like. FIG. 8 illustrates an example window 80 presented by user interface 10 when user 16 selects ADVANCED button 76 (FIG. 6) to assist user 16 in providing some of the curvature data.

Figure 9:
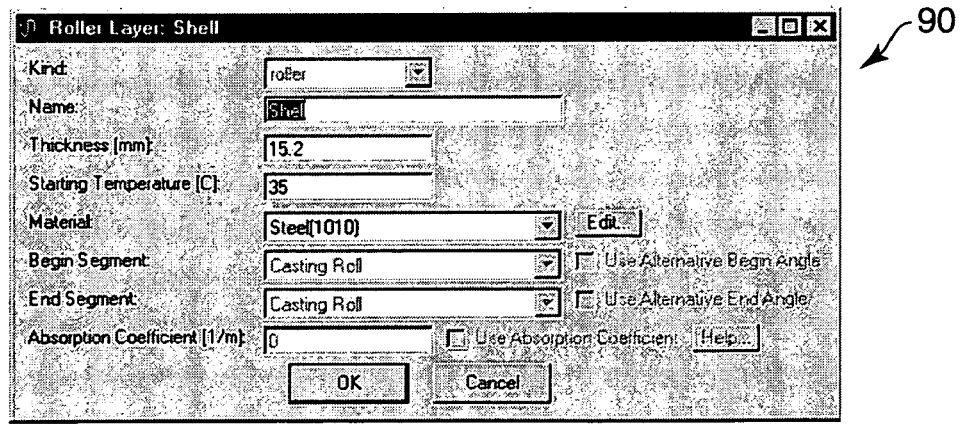
FIG. 9 illustrates an example window for capturing data describing a layer provided by a rotating member.
Figure 10:
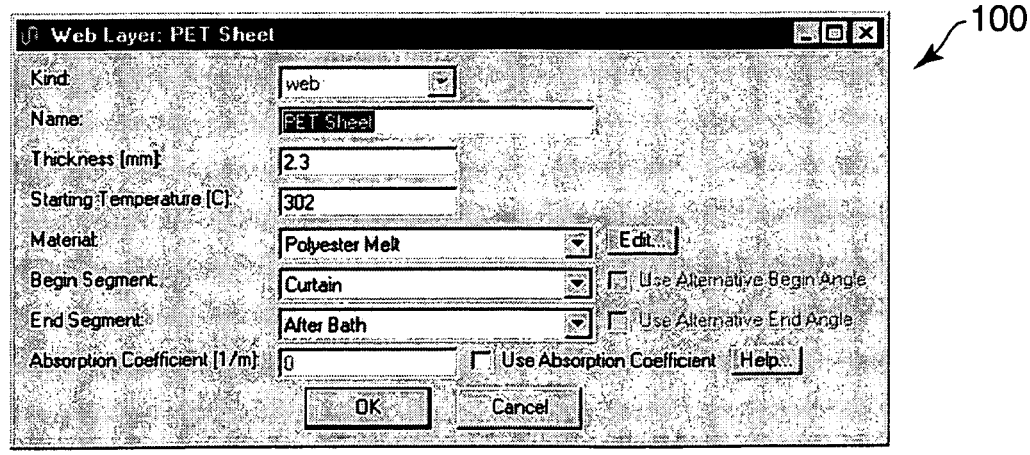
FIG. 10 illustrates an example window for capturing data describing layers of the material.

FIG. 9 illustrates an example window 90 presented by user interface 10 for capturing data describing a layer provided by a rotating member. In particular, window 90 captures a name, a thickness, a starting temperature, and a material of the layer. Similarly, FIG. 10 illustrates an example window 100 presented by user interface 10 for capturing data describing layers of material 7. The user can associate the layer with a starting segment and an ending segment. In this manner, the layer can be described to span multiple segments.

Figure 11:
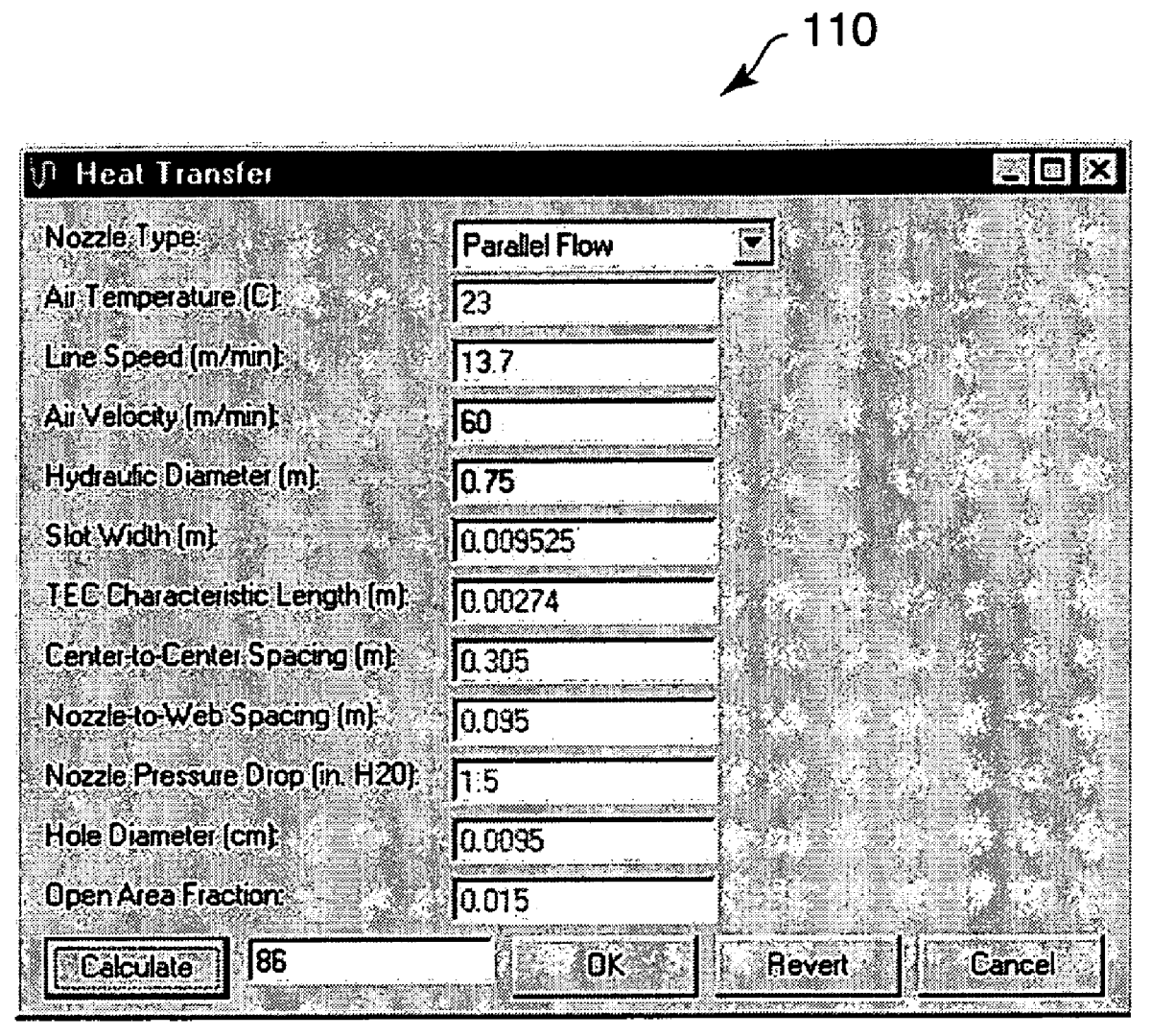

FIG. 11 illustrates an example window 110 presented by user interface 10 with which user 16 interacts to describe other components within manufacturing system 6 that may influences the process parameter being modeled. In this example, user 16 defines a heat source that introduces heat parallel to the flow of material 7 along the path. For this component, window 110 captures a variety of data including air temperature, line speed, air velocity, and the like.

Figure 12:
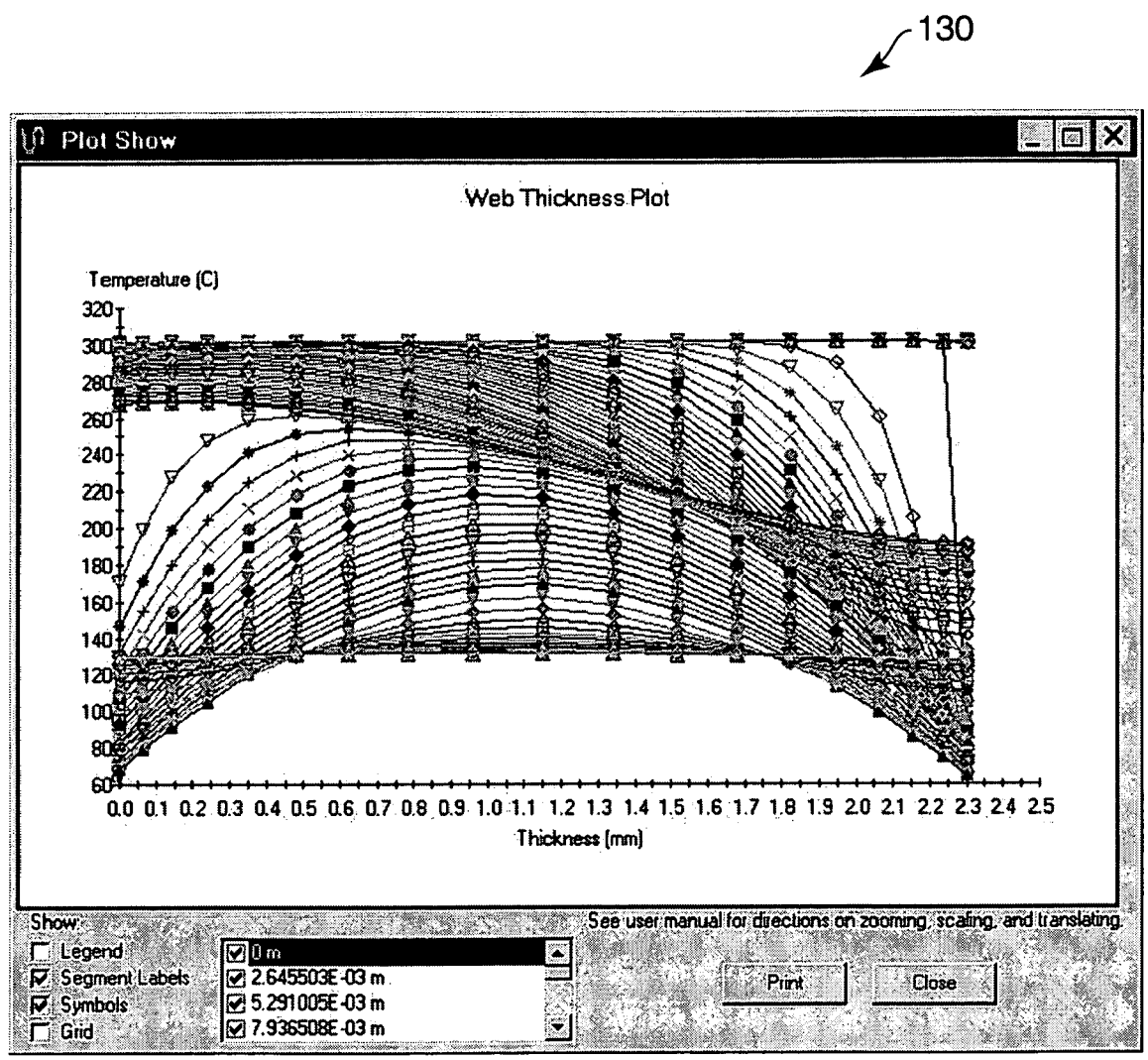
FIGS. 12–13 are graphs produced by the user interface that illustrate calculated values for the process parameter within each segment in accordance with one-dimensional numerical methods.
Figure 13:
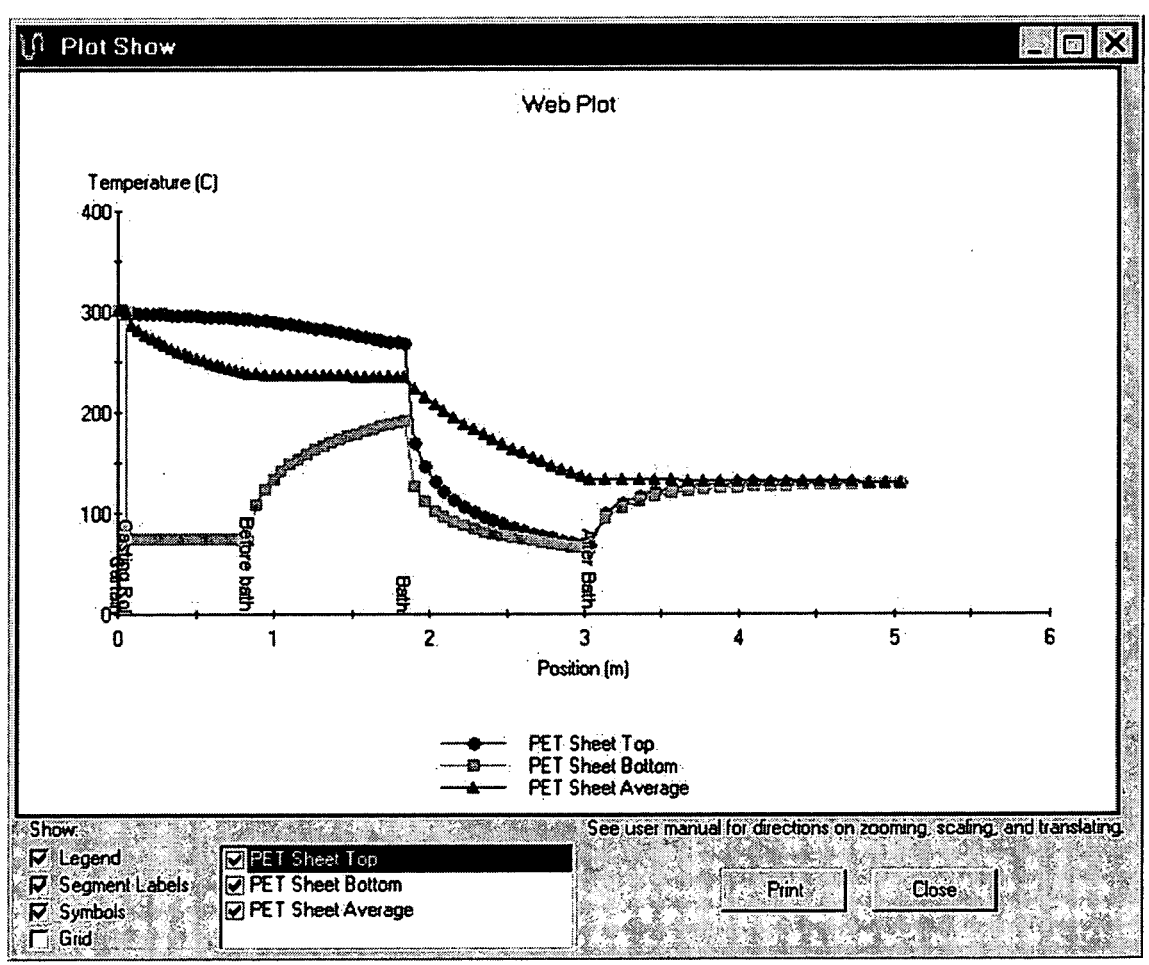

FIG. 12 is a graph 130 produced by user interface 10 that illustrates exemplary calculated values for the process parameter through the thickness of each layer defined by the segment data. FIG. 13 is a graph 140 produced by user interface 10 that illustrates variations of the process parameter within each segment relative to the finite difference locations defined by calculation engine 8 for each layer.

Various embodiments of the invention have been described. These and other embodiments are within the scope of the following claims.

The invention claimed is:

1. A method comprising:
receiving segment data that partitions a process to manufacture a material into a set of segments having one or more layers;
receiving curvature data for the layers;
calculating values for a process parameter through the layers as a function of the curvature data, wherein calculating values comprises invoking a one-dimensional finite difference model to calculate the values, and;
control a manufacturing process based on the process parameter.

2. A computer-readable medium comprising instructions to cause a processor to:
present a user-interface to receive data from a user, wherein the data comprises segment data that partitions a process to manufacture a material into a set of segments having one or more layers, and curvature data that describes the curvature of the layers; and
calculate values for a process parameter through thicknesses of the layers of each segment as a function of the curvature data using a finite difference expression for a grid of locations through the layers, the finite difference expression comprising:

$$\frac{\partial}{\partial z}\left(k\frac{\partial T}{\partial z}\right)_{j,k} = \frac{A_j k_{j+1/2}\frac{T_{j+1}-T_j}{z_{j+1}-z_j} - A_{j-1}k_{j-1/2}\frac{T_j-T_{j-1}}{z_j-z_{j-1}}}{\frac{1}{2}V_j^+(z_{j+1}-z_j) + \frac{1}{2}V_j^-(z_j-z_{j-1})},$$

where:
$A_j=1$ when a layer is flat, but $$A_j = \frac{r_{j+1}+r_j}{r_{OD}}$$

when curved,
$V_j^+=1$ when a layer is flat, but $$V_j^+ = \frac{r_{j+1}+3r_j}{4r_{OD}}$$

when curved, and
$V_j^-=1$ when a layer is flat, but $$V_j^- = \frac{r_{j-1}+3r_j}{4r_{OD}}$$

when curved, and where:
"z" is the distance through the thickness of the layers,
"k" is the conduction constant,
"T" is the process parameter being calculated,
"j" is an index to indicate "z" location nodes, "A" is relative nodal area, "V" is relative elemental volume, "r" is a radius of an arc traversed by a layer along a path of material, and;

"od" is a subscript on variable "r" when the "r" variable refers to the outside diameter of the roll.

3. A computer-readable medium comprising instructions to cause a processor to receive segment data that partitions a process to manufacture a material into a set of segments having one or more layers, wherein the segment data defines layers associated with a component of the manufacturing process and layers associated with the material, and wherein the partitions are defined along a path traversed by the material through the manufacturing process, and further wherein the material is a web, a film, or a sheet;

receive curvature data for the layers;

receive initial conditions for a first one of the segments along the path;

invoke a one-dimensional model based on the initial conditions to calculate values for a process parameter through the layers of a first one of the segments as a function of the curvature data; and invoke the one-dimensional model for each of the remaining segments using the calculated values for the previous segment along the path from each of the segments as initial conditions for the model.

4. The computer-readable medium of claim 3, wherein the one-dimensional model comprises a one-dimensional finite difference model.

5. The computer-readable medium of claim 3, wherein the process parameter comprises one of a temperature, a tension, a strain, a cure, a solvent fraction, and a crystallinity.

6. The computer-readable medium of claim 3, further comprising instructions to receive the segment data from a user via a user interface.

7. The computer-readable medium of claim 3, further comprising instructions to generate the segment data based on input received from a user.

8. The computer-readable medium of claim 3, further comprising instructions to repeatedly invoke the model for each segment of a set of cycling segments until satisfaction of termination criteria.

9. The computer-readable medium of claim 8, further comprising instructions to repeatedly invoke the model until variations of the values for the process parameters for the segment fall below a predefined threshold.

10. The computer-readable medium of claim 3, further comprising instructions to invoke the model by evaluating a finite difference expression for a grid of locations unequally-spaced through the thickness of the material.

11. The computer-readable medium of claim 8, wherein the finite difference expression comprises:

$$\frac{\partial}{\partial z}\left(k\frac{\partial T}{\partial z}\right)_{j,k} = \frac{A_j k_{j+1/2} \frac{T_{j+1}-T_j}{z_{j+1}-z_j} - A_{j-1} k_{j-1/2} \frac{T_j-T_{j-1}}{z_j-z_{j-1}}}{\frac{1}{2}V_j^+(z_{j+1}-z_j) + \frac{1}{2}V_j^-(z_j-z_{j-1})},$$

where:

$A_j=1$ when a layer is flat, but $$A_j = \frac{r_{j+1}+r_j}{r_{OD}}$$

when curved, $V_j^+=1$ when a layer is flat, but $$V_j^+ = \frac{r_{j+1}+3r_j}{4r_{OD}}$$

when curved, and $V_j^-=1$ when a layer is flat, but $$V_j^- = \frac{r_{j-1}+3r_j}{4r_{OD}}$$

when curved;

and where:

"z" is the distance through the thickness of the layers,

"k" is the conduction constant,

"T" is the process parameter being calculated,

"j" is an index to indicate "z" location nodes,

"A" is relative nodal area,

"V" is relative elemental volume,

"r" is a radius of an arc traversed by a layer along a path of material, and;

"od" is a subscript on variable "r" when the "r" variable refers to the outside diameter of the roll.

12. The computer-readable medium of claim 3, further comprising instructions to control a manufacturing process in accordance with the values for each segment.

13. The computer-readable medium of claim 3, further comprising instructions to display to a user the values for each segment.

14. A method comprising:

receiving segment data that partitions a process to manufacture a material into a set of segments having one or more layers;

receiving curvature data for the layers;

calculating values for a process parameter through the layers as a function of the curvature data, wherein calculating the values comprises evaluating a finite difference expression for a grid of locations through the layers, the finite difference expression comprising:

$$\frac{\partial}{\partial z}\left(k\frac{\partial T}{\partial z}\right)_{j,k} = \frac{A_j k_{j+1/2} \frac{T_{j+1}-T_j}{z_{j+1}-z_j} - A_{j-1} k_{j-1/2} \frac{T_j-T_{j-1}}{z_j-z_{j-1}}}{\frac{1}{2}V_j^+(z_{j+1}-z_j) + \frac{1}{2}V_j^-(z_j-z_{j-1})},$$

where:

$A_j=1$ when a layer is flat, but $$A_j = \frac{r_{j+1}+r_j}{r_{OD}}$$

when curved,
$V_j^+ = 1$ when a layer is flat, but $$V_j^+ = \frac{r_{j+1} + 3r_j}{4r_{OD}}$$

when curved, and
$V_j^- = 1$ when a layer is flat, but $$V_j^- = \frac{r_{j-1} + 3r_j}{4r_{OD}}$$

when curved, and where:
"z" is the distance through the thickness of the layers,
"k" is the conduction constant,
"T" is the process parameter being calculated,
"j" is an index to indicate "z" location nodes,
"A" is relative nodal area,
"V" is relative elemental volume,
"r" is a radius of an arc traversed by a layer along a path of material, and;
"od" is a subscript on variable "r" when the "r" variable refers to the outside diameter of the roll; and
controlling a manufacturing process based on the process parameter.

* * * * *

UNITED STATES PATENT AND TRADEMARK OFFICE
CERTIFICATE OF CORRECTION

PATENT NO. : 7,130,781 B2
APPLICATION NO. : 10/120588
DATED : October 31, 2006
INVENTOR(S) : Randy S. Bay Page 1 of 1

It is certified that error appears in the above-identified patent and that said Letters Patent is hereby corrected as shown below:

Title Page, Item (56) (U.S. Patent Documents)
Line 1, after "Andersh" insert -- et al. --.

Col. 4
Line 67, after "as" delete "a".

Col. 6
Line 7, after "boundaries of the" delete "of".

Col. 7
Line 13, " $G=I_s \overline{\overline{K}} e^{-\overline{K}z}$ " and insert -- $G=I_s \; \overline{K} \; e^{-\overline{K}z}$ --, therefor.

Col. 12
Line 19, in claim 1, delete "control" and insert -- controlling --, therefor.

Signed and Sealed this

Twenty-second Day of May, 2007

JON W. DUDAS
*Director of the United States Patent and Trademark Office*